US012699498B2

(12) United States Patent
Aupetit et al.

(10) Patent No.: US 12,699,498 B2
(45) Date of Patent: Aug. 4, 2026

(54) ACTIVE LEARNING FOR SCALABLE ARRANGEMENT AND GROUPING OF DATA

(71) Applicant: Qatar Foundation for Education, Science and Community Development, Doha (QA)

(72) Inventors: Michael Jean-Marie Aupetit, Doha (QA); Abdelkader Baggag, Doha (QA); Ala Abuthawabeh, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 18/199,175

(22) Filed: May 18, 2023

(65) Prior Publication Data

US 2023/0376164 A1 Nov. 23, 2023

Related U.S. Application Data

(60) Provisional application No. 63/364,905, filed on May 18, 2022.

(51) Int. Cl.
G06F 3/04817 (2022.01)
G06F 3/04847 (2022.01)

(52) U.S. Cl.
CPC ...... G06F 3/04817 (2013.01); G06F 3/04847 (2013.01)

(58) Field of Classification Search
CPC ............. G06F 3/04817; G06F 3/04847; G06F 2203/04806; G06F 3/04815; G06F 3/04845; G06T 11/206
See application file for complete search history.

(56) References Cited

U.S. PATENT DOCUMENTS 6,144,962 A * 11/2000 Weinberg ............... G06Q 30/02
714/E11.181
7,239,316 B1 * 7/2007 Cox ...................... G06T 11/206
345/440.1

(Continued)

FOREIGN PATENT DOCUMENTS

| CN | 109697248 A * 4/2019 | |
| JP | 2004532489 A * 10/2004 | ............. G06F 30/36 |
| JP | 2009505261 A * 2/2009 | ........... G06F 16/745 |

OTHER PUBLICATIONS

Chegini, et al.; "Interactive labelling of a multivariate dataset for supervised machine learning using linked visualisations, clustering, and active learning"; ScienceDirect; 2019; (9 pages).

(Continued)

*Primary Examiner* — Rashawn N Tillery
(74) *Attorney, Agent, or Firm* — K&L Gates LLP

(57) ABSTRACT

Active learning for scalable arrangement and grouping of data is provided by determining a visibility budget for a user interface to display icons divided groups, wherein each icon provides visualization in the user interface for a corresponding data set; dividing the visibility budget between the groups to provide each group with an individual visibility budget; determining an assigned subset of data sets that are assigned to each group; and for each group: determining a displayable number of icons that can be displayed in the user interface based on the individual visibility budget; identifying the displayable subset of data sets from the assigned subset of data sets that are most representative of the group; and displaying, in a portion of the user interface associated with the group, associated icons for the data sets belonging to the displayable subset.

17 Claims, 15 Drawing Sheets

(56) References Cited

U.S. PATENT DOCUMENTS

| | | | | |
|---|---|---|---|---|
| 7,779,344 | B1* | 8/2010 | Hao | G06Q 10/06 |
| | | | | 715/275 |
| 9,928,646 | B2* | 3/2018 | Chew | G06T 17/005 |
| 10,249,263 | B2* | 4/2019 | Hendry | G06T 1/20 |
| 10,955,989 | B2* | 3/2021 | Gomez-Rosado | G06Q 20/204 |
| 11,222,453 | B1* | 1/2022 | Aupetit | G06F 3/0486 |
| 11,282,012 | B1* | 3/2022 | Mandaro | G06Q 10/0633 |
| 2006/0090141 | A1* | 4/2006 | Loui | G06F 16/447 |
| | | | | 715/764 |
| 2007/0168879 | A1* | 7/2007 | Reville | G06F 3/04817 |
| | | | | 715/810 |
| 2008/0256577 | A1* | 10/2008 | Funaki | G06F 3/04815 |
| | | | | 707/E17.026 |
| 2011/0047509 | A1* | 2/2011 | Arrasvuori | G09B 29/007 |
| | | | | 706/54 |
| 2012/0233573 | A1* | 9/2012 | Sullivan | G06F 16/26 |
| | | | | 715/848 |
| 2012/0311496 | A1* | 12/2012 | Cao | G06F 16/287 |
| | | | | 715/821 |
| 2013/0066592 | A1* | 3/2013 | Aupetit | G06F 18/2137 |
| | | | | 702/181 |
| 2014/0333629 | A1* | 11/2014 | Sud | G06T 11/001 |
| | | | | 345/440 |
| 2014/0372953 | A1* | 12/2014 | Laurance | G06F 3/04817 |
| | | | | 715/835 |
| 2015/0193119 | A1* | 7/2015 | Chai | G06F 3/04817 |
| | | | | 715/835 |
| 2015/0287038 | A1* | 10/2015 | White | G06Q 10/04 |
| | | | | 715/769 |
| 2015/0378556 | A1* | 12/2015 | Ramanathan | G06F 3/04842 |
| | | | | 715/765 |
| 2016/0313957 | A1* | 10/2016 | Ebert | H04W 4/02 |
| 2017/0242560 | A1* | 8/2017 | Goldstein | G06T 11/206 |
| 2021/0065416 | A1* | 3/2021 | Shum | G06F 3/0482 |
| 2021/0286510 | A1* | 9/2021 | Tyler | G06F 3/0484 |
| 2022/0108502 | A1* | 4/2022 | Aslandere | G06F 3/0482 |

OTHER PUBLICATIONS

Nonato, et al.; "Multidimensional Projection for Visual Analytics: Linking Techniques with Distortions, Tasks, and Layout Enrichment"; IEEE; vol. 25, Issue 8; 2018; (5 page).

Legg, et al.; "Multidimensional Projection for Visual Analytics: Linking Techniques with Distortions, Tasks, and Layout Enrichment"; Human-centric Computing and Information Sciences; 2019; (25 pages).

* cited by examiner

500

510 — Determine Visibility Budget for User Interface

520 — Divide Visibility Budget Among Groups

530 — Determine Displayable Number of Icons for Each Group

540 — Identify Representativeness of Data Sets in Each Group

550 — Display Icons for Data Sets based on Representiveness

560 — Output Visibility Indicator for Group Membership

To/From Other Devices

ACTIVE LEARNING FOR SCALABLE ARRANGEMENT AND GROUPING OF DATA

CROSS-REFERENCES TO RELATED APPLICATIONS

The present disclosure claims priority to U.S. Provisional Patent Application No. 63/364,905 entitled "ACTIVE LEARNING FOR SCALABLE ARRANGEMENT AND GROUPING OF DATA" and filed on May 18, 2022, which is incorporated herein by reference in its entirety.

BACKGROUND

Arrangement and Grouping (A&G) actions are essential to human intelligence, and can help domain experts explore new data and generate hypotheses about groupings, or assign data to groups for training automatic classifiers. Voronoi treemaps are static idioms that represent hierarchical quantitative data graphically, such as in A&G actions. However, various A&G actions can suffer from limitations regarding space and time scalability because a large number of images within a limited screen space degrades how a human user can visually perceive the representations due to occlusion or small size, and the capacity to interact by dragging or clicking the representations. Moreover, displaying too many images at once can make the A&G task overwhelming, tedious and time consuming, and generally unpleasant for the human user, thus making a potentially useful tool more likely to hinder task completion than to aid in task completion.

SUMMARY

Figure 1A:
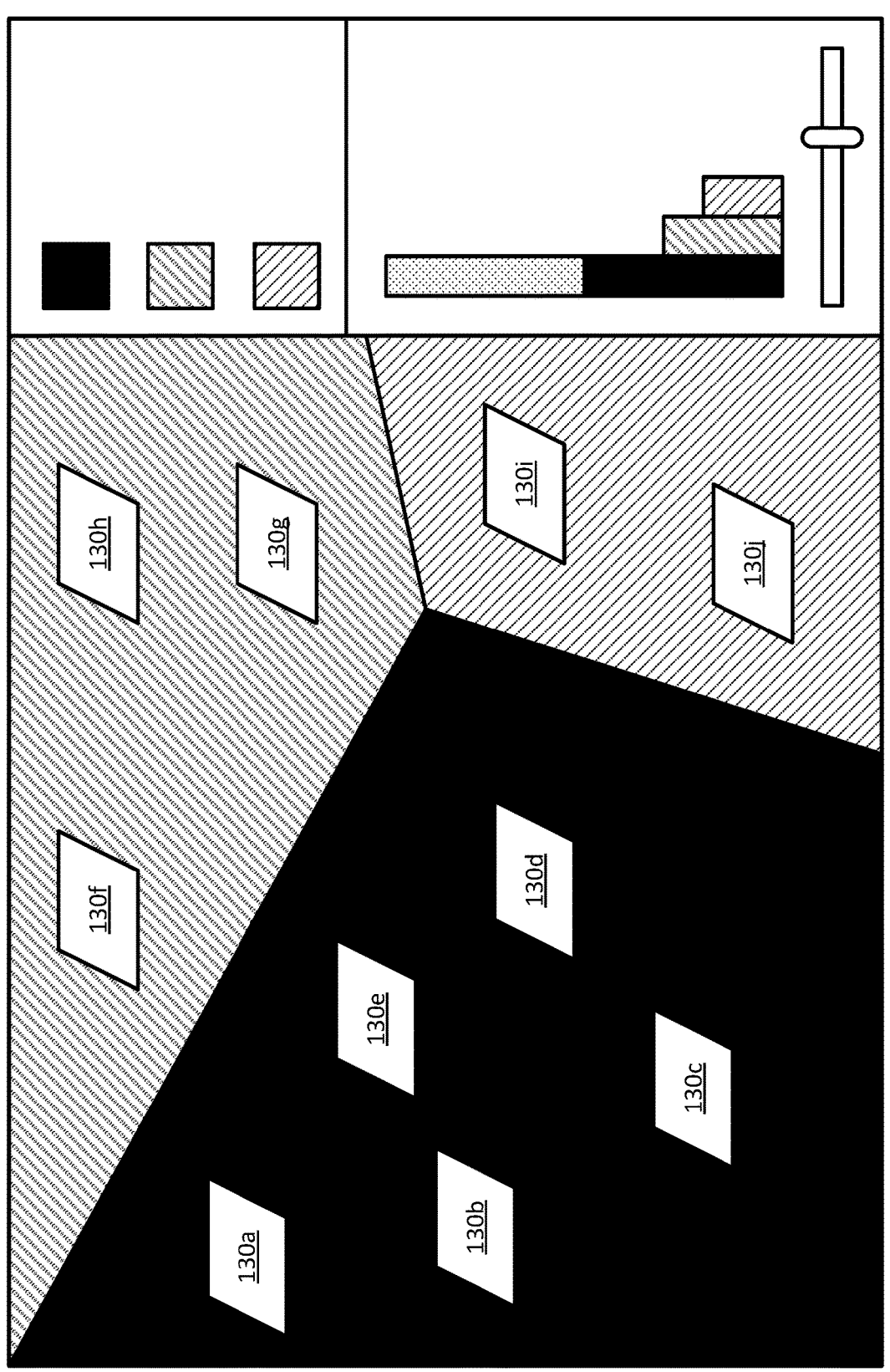
FIGS. 1A-1C illustrate example user interfaces for displaying icons in groups according to an Interactive Voronoi Treemap (IVT) in an Arrangement and Grouping (A&G) task, according to embodiments of the present disclosure.

The present disclosure generally relates to a system and method for the improved presentation of data as part of an Arrangement and Grouping (A&G) action using color coding and spatialization of classification probabilities via Interactive Voronoi Treemaps (IVTs).

In light of the present disclosure, and without limiting the scope of the disclosure in any way, in an aspect of the present disclosure, which may be combined with any other aspect listed herein unless specified otherwise, a computing system for scaling the arrangement and grouping of visual representations of data is provided. The computing system includes one or more processors and a memory in communication with the one or more processors that stores instructions. The one or more processors are configured to execute the instructions to perform operations that include: determining a visibility budget for a user interface to display a plurality of icons divided among a plurality of groups, wherein each icon provides visualization in the user interface for a corresponding data set from a plurality of data sets; dividing the visibility budget between the plurality of groups to provide each group of the plurality of groups with an individual visibility budget; determining an assigned subset of data sets from the plurality of data sets assigned to each group of the plurality of groups; for each group of the plurality of groups: determining a displayable number of icons that can be displayed in the user interface based on the individual visibility budget; identifying the displayable subset of data sets from the assigned subset of data sets that are most representative of the group, wherein a number of displayable subsets is equal to a lesser of the displayable number or a total number of data sets belonging to the assigned subset for the group; displaying, in a portion of the user interface associated with the group, associated icons for the data sets belonging to the displayable subset; and outputting, in the portion of the user interface associated with the group, a percentage indicator identifying a ratio of the displayable subset of data sets relative to the assigned subset of data sets.

In some aspects, the percentage indicator is a stacked bar chart having a first segment associated with the displayable subset of data sets and a second segment associated with a remainder of the assigned subset of data sets not included in the displayable subset of data sets.

In some aspects, the visibility budget is divided substantially evenly among all of the plurality of groups.

In some aspects, the visibility budget is determined based on a zoom level, a pagination of the user interface, a display area of the user interface, and a size of the icons.

In some aspects, identifying the displayable subset of data sets from the assigned subset of data sets that are most representative of the group includes assessing members of the assigned subset of data sets based on a centrality measure for membership in the group, wherein the members that score higher on the centrality measure are deemed more representative than the members that score lower on the centrality measure.

In some aspects, the operations further comprise in response to receiving selection of a first group, for each group of the plurality of groups other than the first group: identifying the displayable subset of data sets from the assigned subset of data sets that are most representative of the first group; displaying, in the portion of the user interface associated with the group, associated icons for the data sets belonging to the displayable subset; and outputting, in the portion of the user interface associated with the group, a percentage indicator identifying a ratio of the displayable subset of data sets relative to the assigned subset of data sets.

In some aspects, displaying, in the portion of the user interface associated with the group, the associated icons for the data sets belonging to the displayable subset further comprises, arranging the associated icons in a helical pattern in the portion of the user interface, wherein the associated icons are arranged in the helical pattern sequentially according to a centrality measure, wherein the associated icons associated with higher centrality measures are displayed more centrally in the helical pattern and the portion of the user interface than the associated icons associated with lower centrality measures.

The reader will appreciate the foregoing details, as well as others, upon considering the following detailed description of certain non-limiting embodiments including a system and method for detecting an abusive online content according to the present disclosure.

DETAILED DESCRIPTION

The present disclosure generally relates to a system, a method, and a computer readable storage device for improved presentation of data as part of an Arrangement and Grouping (A&G) action using Interactive Voronoi Treemaps (IVTs), which may be provided as a method, a computer-readable storage device having instructions that are executable by a processor to perform the method, or a computing system having at least one processor and at least one memory including instructions executable by the processor to perform the method.

Although IVT typically seeks to maximize the distances between icons to avoid overlap and clutter, user interfaces compete against this distance goal by maintaining a minimal size for each icon (e.g., to make those icons readable) and having a finite amount of space in which to display the IVT, which entails the impossibility to display too many icons at once in a finite screen space without occlusion. Hence, not all icons can be made visible at a time. Therefore, users need to know the proportion of visible and invisible icons in each group to get a sense of the importance of a group and how complete the grouping task is.

Users also need to be able to select which icons will be made visible to interact with, which can save arrangement time. Grouping relies on arranging icons for side-by-side comparison to for a user decide whether an icon is an outlier (to be removed from a group) or an inlier (that contributes to give the group its meaning). However, when most of the icons in a group are not visible, the user is prevented from faithful overview of the group's content. Therefore, users need to be able to visualize and easily access the most representative icons of each group and to evaluate how representative these "most representative icons" actually are.

Because grouping task completion requires that every single icon is assigned to a group (potentially including a discarded group), time and focus are scarce user resources while taking each assignment decision that must be accounted for in the user interface, especially for accountability in sensitive application domains. Therefore, users need to be able to visualize and easily access the most likely icons to assign to a group to operate that assignment faster and thereby focus remaining time on harder decisions. Additionally, the users need to keep control of the assignment decisions to feel empowered and take responsibility.

The present disclosure therefore provides a visibility management panel. An example visibility management panel uses a vertically stacked bar chart to display the quantity of visible and invisible data in each group, where each bar is made of two stacked segments in which the bottom and top segments respectively represent the number of visible and invisible data in a certain group. In some embodiments, the bottom bar is filled with the same solid color as the associated group cell while the top bar gets a lighter tone of the same color to express the percentage of invisible or not displayed icons. In various embodiments, horizontally stacked bar charts, adjacently positioned bar charts, three-dimensional bar charts, pie charts, or the like may be used in the visibility management panel to indicate the two membership subsets (e.g., visible and invisibly) in a group.

For example, consider a clinician analyzing wearable data and icons from 264 patients recorded over a week. Each data set includes a summary or statistics like the average duration of physical activity at some intensity level across all days of the week. Each icon can depicts these activity data over the full week as horizontal segments color coding the duration and intensity of the physical activity (e.g., as reddish pixels) versus resting activity (e.g., bluish pixels). The clinician aims to explore resting activity patterns in the icon data and discover interesting groups. Accordingly, the clinician can sets a visibility slider to get readable number of icons on the display device (e.g., 100 versus 264). The clinician can use pagination (D) to get an overview of the data set, and begin grouping the icons associated with individual data sets by similarity of resting patterns as indicated in the segmented color coding.

After the clinician has performed an initial sorting of the icons, various groups may be defined. The clinician can check the homogeneity of an individual group by using own-group centrality to determine whether data sets assigned to one group should instead be assigned to a second group. In various embodiments, as the membership to the group is updated, which icons belonging to the group that are displayed as the most representative may change, as may the ratio indicated by the percentage indicator of what ratio of assigned data sets are visible in the user interface according to the present display budget.

Similarly, once the groups are big enough, the clinician can use a target-group predictive option to trigger model training and prediction to identify data sets that are likely to belong to a targeted group. In some embodiments, the model may automatically assign data sets to the targeted group (e.g., based on a probability or confidence threshold) or present the icons of candidate data sets to the user for manual assignment to a group.

FIG. 1A illustrates an example user interface 100 that includes a visibility management panel 110 to manage three groups 120a-c (generally or collectively, groups 120) with various numbers of icons 130a-h (generally or collectively icons 130) of data assigned to an individual group 120, according to embodiments of the present disclosure. The visibility management panel 110 includes a legend 140, showing the colors, patterns, or effects used to identify different groups 120, or show that a given group 120 has been selected, and includes a visibility tracker 150, such as a bar chart showing the number of data sets that are currently assigned to each group 120, and what percent of those data sets are represented by visible icons 130 versus are not shown with corresponding visible icons 130 in the user interface (e.g., hidden or invisible icons 130).

Although not illustrated in the user interface 100 shown in FIG. 1A, for purpose of example and discussion, icons 130i-p are also discussed to represent data that are not initially displayed (e.g., start as hidden) in the user interface 100, but that may be later displayed when screen space or imaging budget becomes available. Similarly, various instances of the icons 130 may be removed from display (but still represent data that could be displayed) when screen space or imaging budget changes occur.

Similarly, although not illustrated in the user interface 100 shown in FIG. 1A, for purpose of example and discussion, a fourth group 120d is also discussed to assigned data to that is not initially displayed in the user interface 100, but may be later displayed when the fourth group 120d is manually created (e.g., by a user) or created via a machine learning model identifying a new central tendency about which to define a group 120. Similarly, various instances of the groups 120 may be removed from display when a user or machine learning model depopulates the group 120 or merges two or more groups 120 together.

Although the examples discussed herein in relation to four groups 120*a*-*d* and sixteen icons 130*a*-*p*, the present disclosure contemplates that more of fewer groups 120 with more or fewer icons 130 displayed therein may be used in various embodiments.

In various embodiments, the groups 120 are visually distinguished from one another by using different colors, patterns, overlays, labels, or the like in addition to or alternatively to visible borders between the groups 130. For example, in FIG. 1A, the first group 120*a* is shown with a solid black color, the second group 120*b* is shown with a first pattern, and the third group 120*c* is shown with a second pattern. These patterns and colors are included in a legend 140, which may include additional text or other information about the groups (e.g., labels, membership statistics, center tendency, metric used by a machine learning model to define the group 120, etc.).

The visibility tracker 150 may use the colors and/or labels for the groups 120 to show to a user of the user interface 100 what portions of the data sets are visible versus invisible in the current display of the user interface 100. As shown, each bar of the visibility tracker 150 includes two parts: a first part representing the visible icons 130 for the associated group 120, and a second part representing the hidden/invisible icons 130 for the associated group 120. For example, the first group 120*a* is shown with a first part in the visibility tracker 120 that is solid black in color to indicate the visible icons 130*a*-*e* assigned to the first group 120*a* in FIG. 1A, which is equal in size to a second part that is a different color/pattern belonging to the same bar, which indicates that the first group 210*a* includes an equal number of "hidden" icons 130. Continuing the example, a second bar is shown with the color/pattern of the second group 120*b* and a third bar is shown with the color/pattern of the third group 120*c*, indicating that the second bar represents the membership and visibilities of the second group 120*b* and the third bar represents the membership and visibilities of the third group 120*c*. The second and third bars as sized accordingly to the percentage of the data sets assigned to the respective groups 120 (e.g., smaller than the first bar, the second bar larger than the third bar), and since the associated groups 120 do not include any hidden icons 130 (e.g., all data sets are associated with visible icons 130), no second portion is included with the respective bars.

In various embodiments, the present disclosure uses an approach that assigns the visibility budget to each group 120 in proportion to the relative sizes of the groups 120 so that groups 120 with more members are given a larger portion of the visibility budget. One challenge to this approach is that most of the groups 120 have visibility budgets set too small in the initial budgeting, particularly when an initial undetermined group 120 is present, because the initial undetermined group 120 is often far bigger than others at the beginning of the A&G action. Stated differently, at a beginning of an A&G action when a majority of data have not been definitively assigned to a group 120, the initial assignment of the visibility budget may be overwhelmed by comparatively high membership in a group 120 to which "unassigned" data are initially stored, an incorrect number of groups 120 (compared to the final assignment), inaccurate machine-assignment of data to groups 120, and combinations thereof.

Accordingly, in some embodiments, the present disclosure provides at least a baseline amount of the visibility budget to each group 120 or a ceiling amount of the visibility to any one group 120 to avoid any one group 120 being assigned too small or too great of a portion of the total visibility budget to allow a user to easily view and interact with the icons 130. For example, if a first group includes 99% of the data and a second group includes 1% of the data, the first group may be assigned 99% of the budget, and the second group assigned 1% of the budget unless a baseline budget of B % is set (e.g., where B is 5, 10, or a user selected value) such that the second group is assigned at least B % of the budget and the first group is assigned 100-B % of the budget.

In various embodiments, the present disclosure computes a centrality measure of each icon data based on some summary statistic (medoid) of the associated group 120 to determine which of the icons 130 in a group 120 should be visible versus invisible. Several statistics could be used like the Euclidean distance to the group medoid (mean or median) in different embodiments. Additionally or alternatively, the probability that an icon data is assigned to a certain group 120 is given by a classifier set to predict the probability for each icon data to belong to any of the groups 120. This approach tends to increase the differences between the most central icon data of each group 120, and uses a multinomial logistic regression model taking as inputs, the features of the data associated to each icon 130, and as output a categorical variable representing the group 120 of that icon 130. The model is trained on all groups 120 as the user assigns members to the groups 120.

In various embodiments, the model uses spatialization and opacity to visualize the icons 130 with a graphical saliency reflecting their group centrality in which the model first ranks icons by decreasing centrality. Then the model locates the most central icon of a group on the leaf cell closest to the center of gravity of its group cell. The model then maps the remaining icons in sequence, along concentric layers around the first one, over the Voronoi adjacency network of the leaf cells of the group. Stated differently, the user interface may display the icons in a (substantially) helical or concentric pattern, with a most representative icon being located at an origin of the helix or concentric rings and central to the portion of the user interface associated with the group, and less representative icons spiraling around the origin (and being located closer to an edge of a portion of the user interface associated with the corresponding group).

Figure 1B:
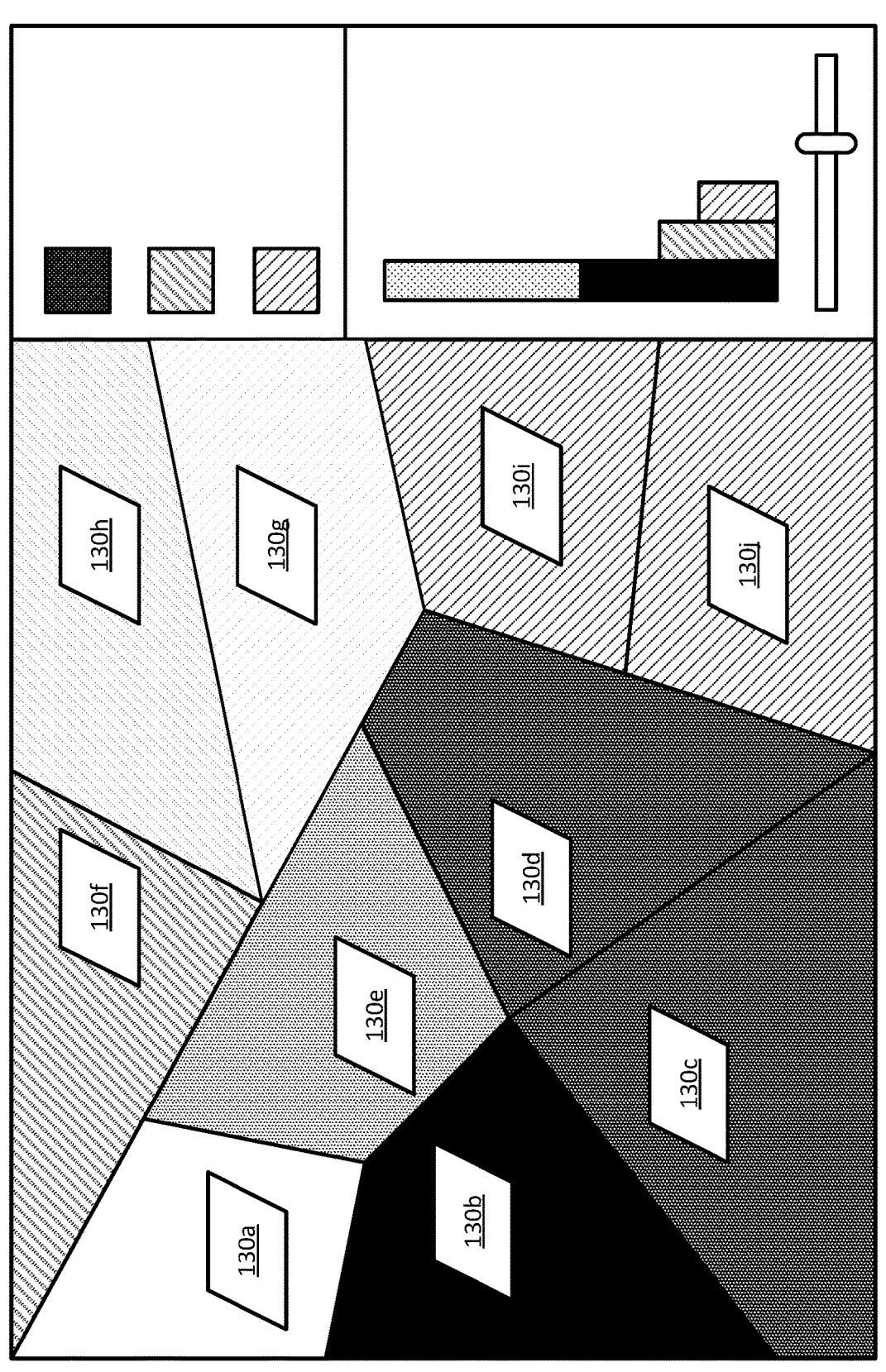

For example, as shown in FIG. 1B, the applied colors and patterns are adjusted from those shown in FIG. 1A to visually indicate the centrality measure using a helical pattern with the more-central icons 130 displayed closer to the visual center of the group 120 than less-central icons 130, according to embodiments of the present disclosure, which may be set via an opacity of the cells in which each of the icons 130 are displayed. All visible cells are allotted in each group 120 independently of what cells are allotted in other groups 120. The opacity of the cells depends on the concentric layers and aims to reinforce the perception of the spatial encoding. Using exact centrality values for opacity encoding may bring more confusion with an unnecessary level of detail, blurring the concentric arrangement of the icons 130, and is therefore not used in various embodiments.

The model computes a group assignment prediction measure for each icon data based on a classifier to determine which of the icons 130 should be visible in a given group. The model can use the same multinomial logistic regression model as for group centrality-based arrangement except that the model is trained on all but the undetermined or not-yet-assigned group. However, each icon 130 can be assigned to any group 120 by the user, hence it is relevant to make an icon visible when that icon 130 is likely to be assigned to the group 120 under focus, and not visible otherwise. Hence, a menu allows a user to select the target group of the prediction. Again, the model uses spatialization and opacity to visualize the icons 130 with a graphical saliency reflecting each icon's assignment probability to the target group, which can follow the same centrality-based approach for mapping the icon 130. but by ranking the icons 130 by a decreasing probability of being assigned to the target group, and picking the center of gravity of the target group cell as the unique root of the concentric layout.

Figure 1C:
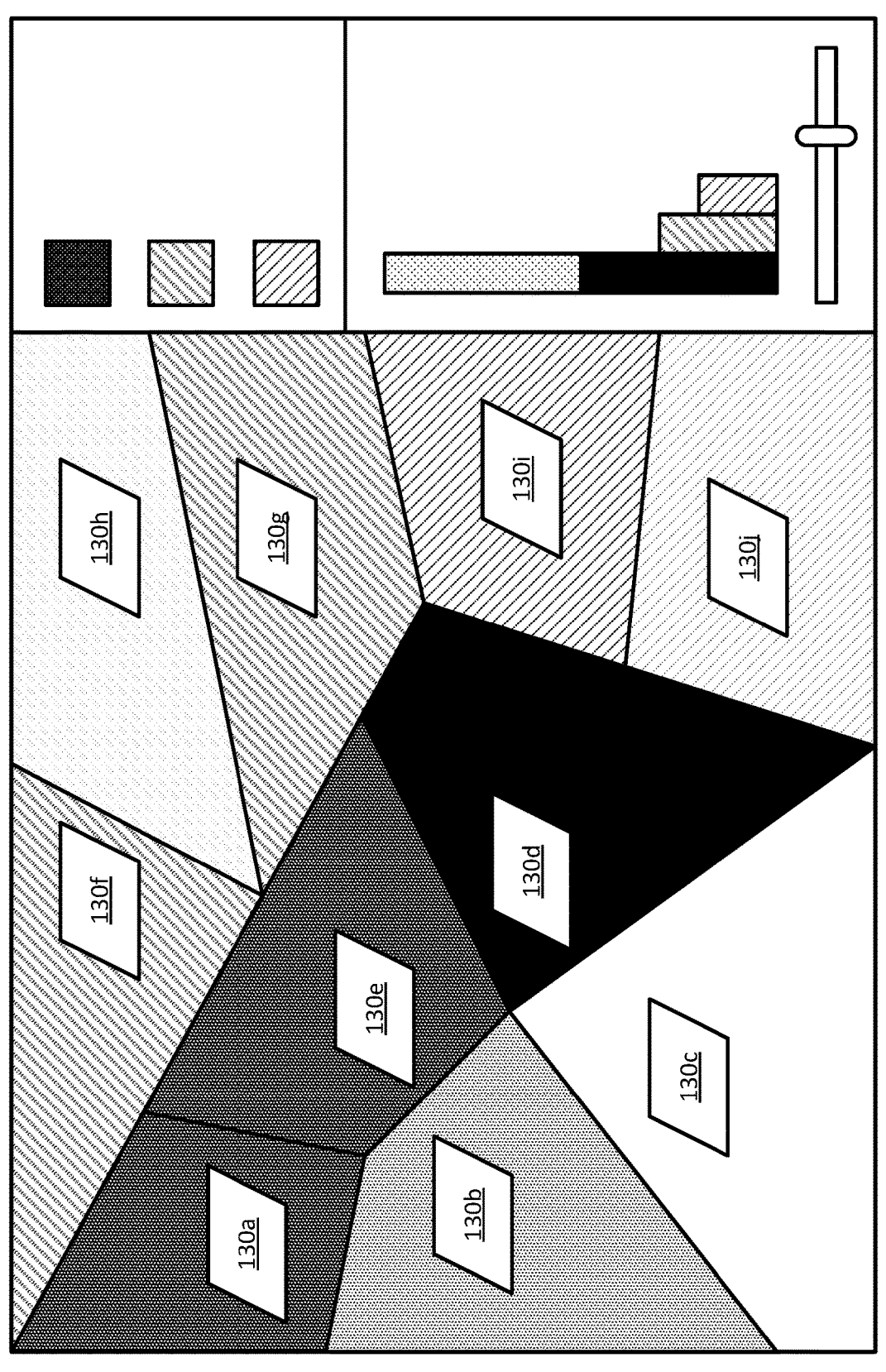

For example, in FIG. 1C, the applied colors and patterns are adjusted from those shown in FIG. 1A to visually indicate the centrality measure at the edge of the group 120, according to embodiments of the present disclosure, which may be set via an opacity of the cells in which each of the icons 130 are displayed. All visible cells are allotted in each group 120 independently of what cells are allotted in other groups 120. The opacity of the cells depends on the concentric layers and aims to reinforce the perception of the spatial encoding. Using exact centrality values for opacity encoding may bring more confusion with an unnecessary level of detail, blurring the concentric arrangement of the icons 130, and is therefore not used in various embodiments.

The model propagates the concentric layers across the Delaunay triangulation of all leaf cells, disregarding the boundaries of the groups. The model maps icons 130 in sequence, along these layers, but does so group 120 by group 120, filling all free slots in one group 120 by the icons 130 of that group 120. The model does the same in all groups 120, so that icons 130 within the target groups 120 are arranged the same way as for the centrality-based approach, but in other groups 120, icons 130 with the highest probability gather closer to the target group boundary making easier the manual assignment of those icons 130 into the target group 120 by dragging or other actions.

Figure 2A:
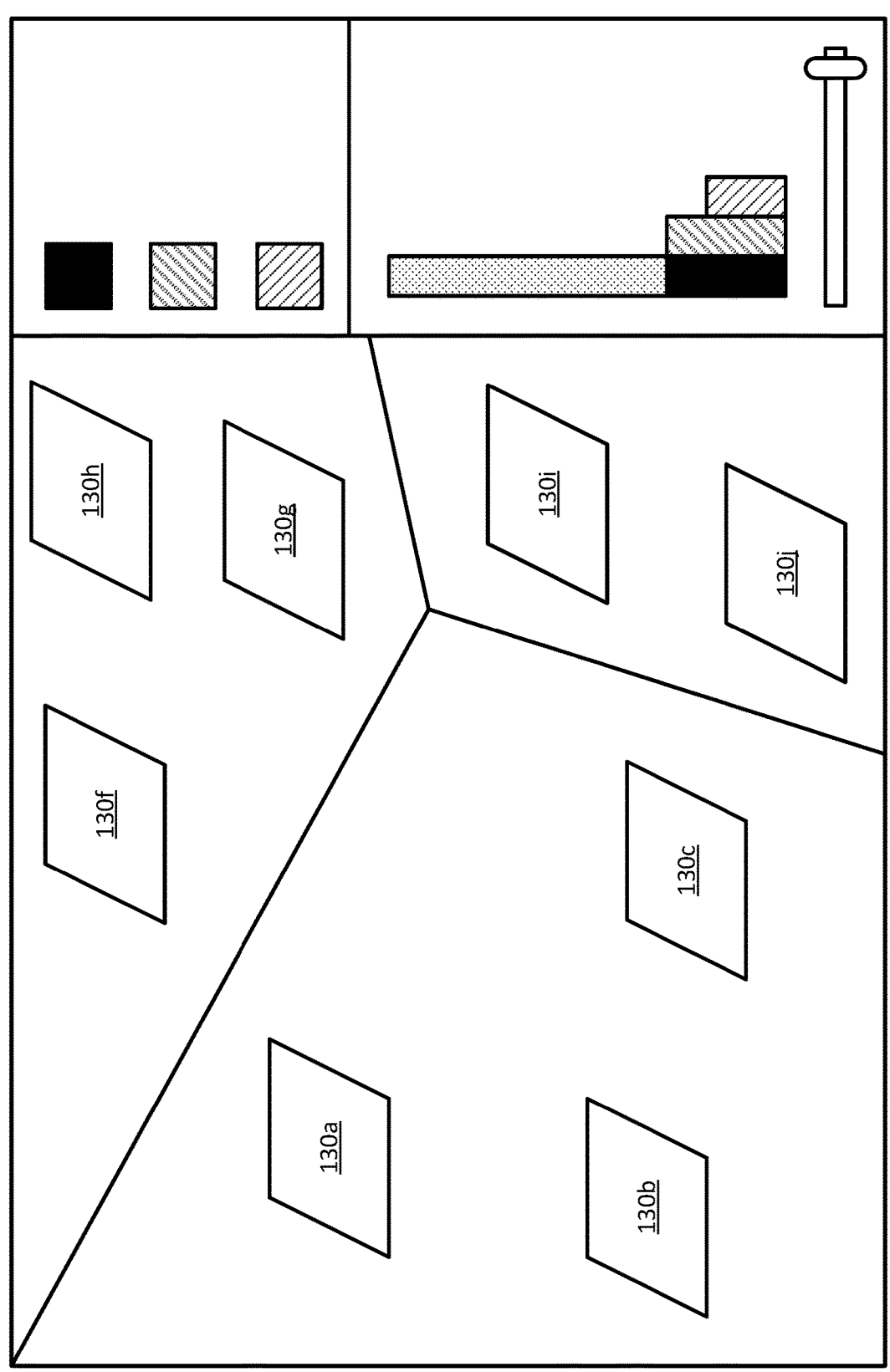
FIGS. 2A-2B illustrate user interfaces offering visibility controls, according to embodiments of the present disclosure.
Figure 2B:
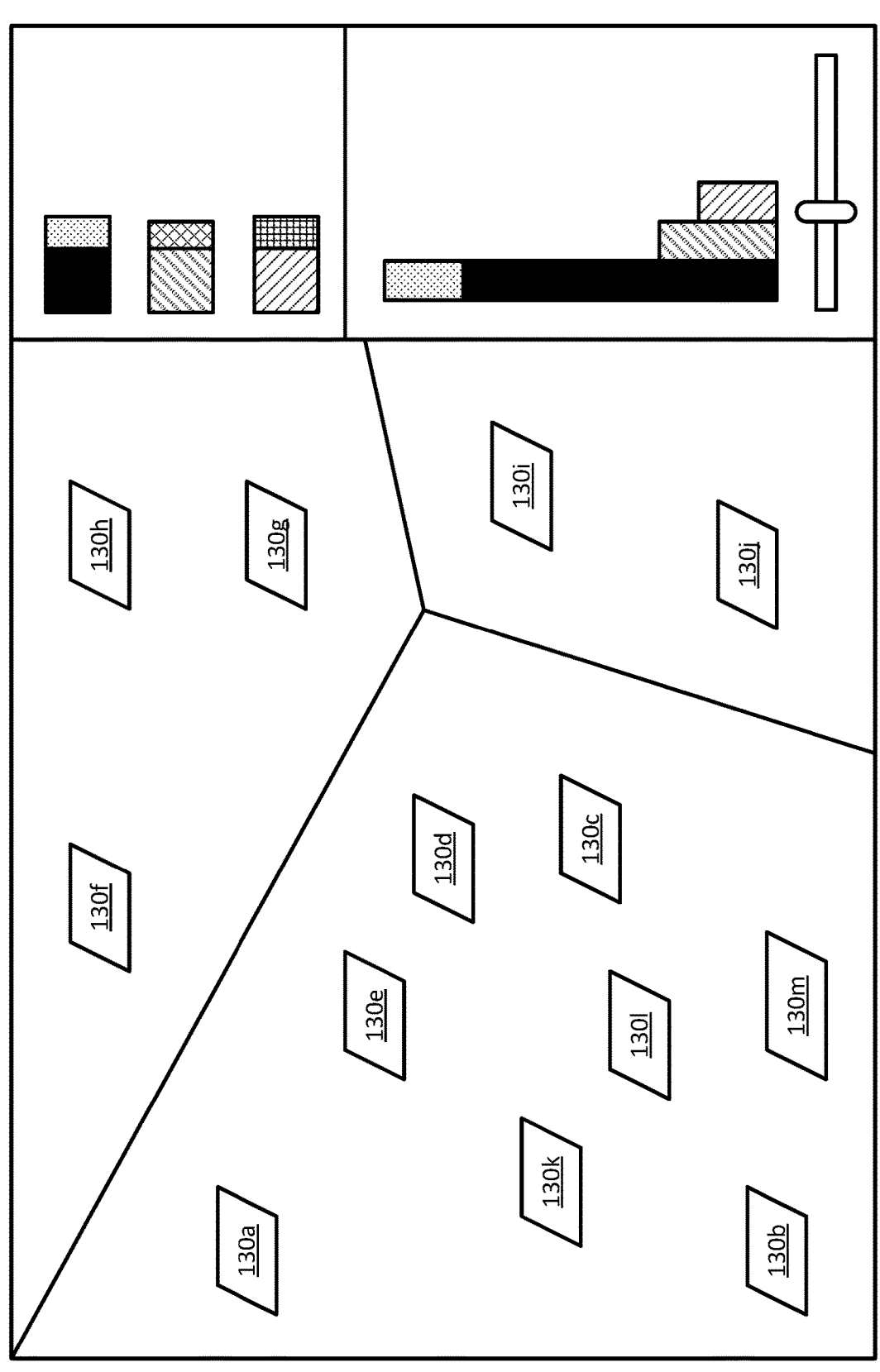

As shown in FIGS. 2A-2B, in some embodiments, a slider control 210 allows the user to set the total amount of visible icons 130 in the user interface 100. For example, a mouse-wheel mapped to the slider control 210 can set the size of all the icons 130 as a zoom function. Additionally or alternatively, the user interface 100 can use pagination to deal with icon visibility selection. In some embodiments, the set of icons 130 in each group 120 is divided into chunks of size based on the amount of visible icons 130 allowed for that group 120.

For example, in FIG. 2A, the user has adjusted a slider from a base position (compared to FIG. 1A) to display larger icons 130 in each group 120, which may decrease the amount of icons 130 that can be displayed in the interface budget allotted to each group 120 (e.g., as in the first group 120a), due to the larger size of the icons 130 displayed, or merely increase the size of the icons 130 displayed therein (e.g., as in the second group 120b and the third group 120c).

For example, in FIG. 2B, the user has adjusted a slider from a base position (compared to FIG. 1A) to decrease the size of icons 130 in each group 120, which may decrease the size of icons 130 in groups that have previously non-displayed data sets (e.g., as in the first group 120a) to allow more icons 130 to be displayed in the same amount of space, but may keep certain icons 130 the same size, and decrease amount of space allocated for inter-icon spacing.

In some embodiments, each group gets an additional pair of back and forth navigation buttons to swap from one chunk to the next. New visible icons 130 replace old ones, each image 130 being assigned to a specific leaf cell, without re-computing the treemap layout. Stated differently, the present disclosure can use a watershed approach to determine the amount of visible icons 130 for each group 120, as if the bars of the bar chart were forming a cave to flood with a fixed amount of water trying to reach the same level in each bar. The present disclosure therefore considers the total visibility budget for the user interface as a set of tokens to distribute among the groups, and loops through all groups and assign tokens one by one until the capacity of the groups (e.g., the number of icons 130 each group 120 contains) is reached or the budget depleted. Stated differently, the groups can be assigned substantially equal portions (e.g., ±1) of the visibility budget.

Figure 3A:
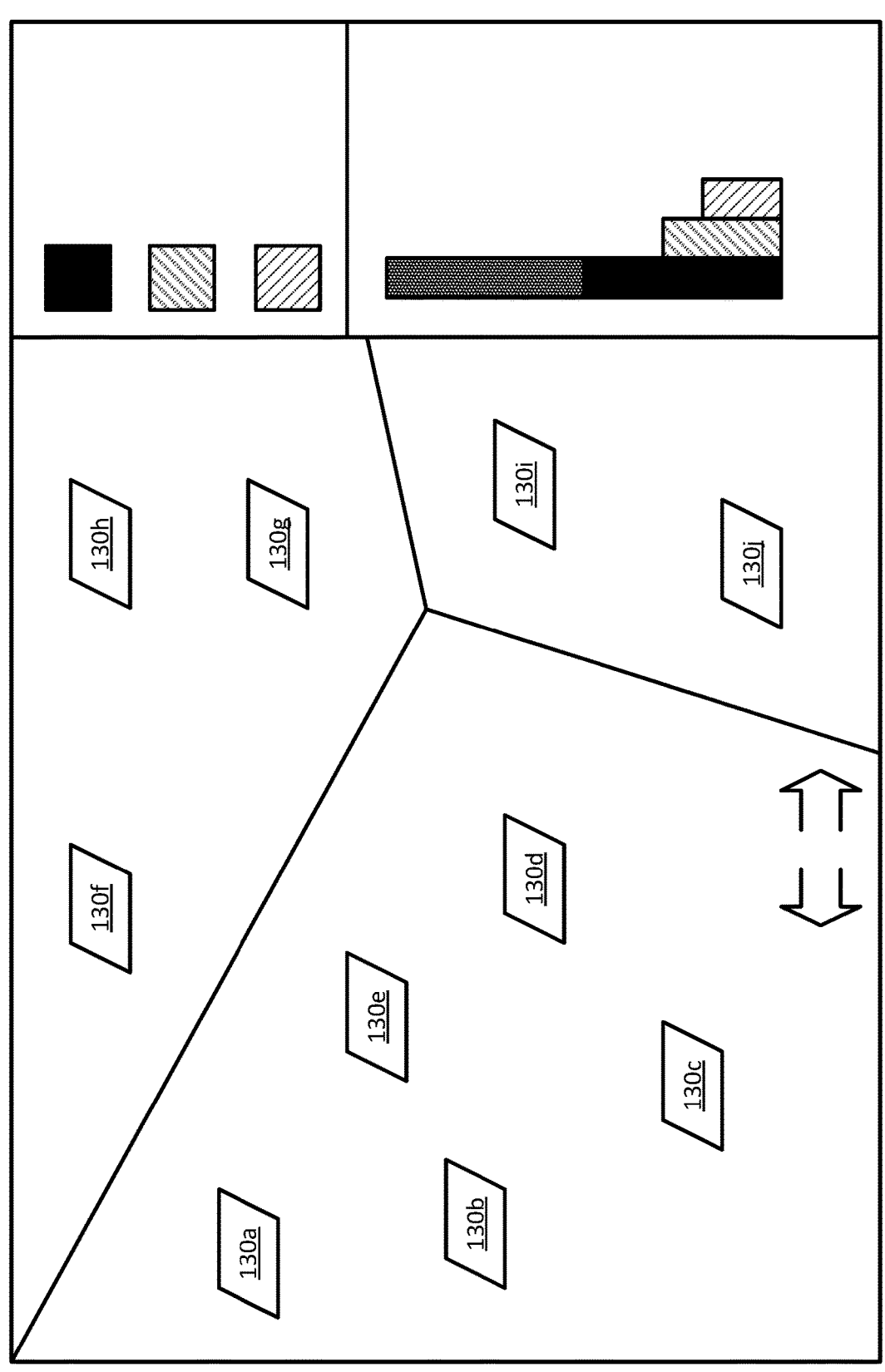
FIGS. 3A-3C illustrate an example of a user interface offering navigation controls for viewing "hidden" icons, according to embodiments of the present disclosure.
Figure 3B:
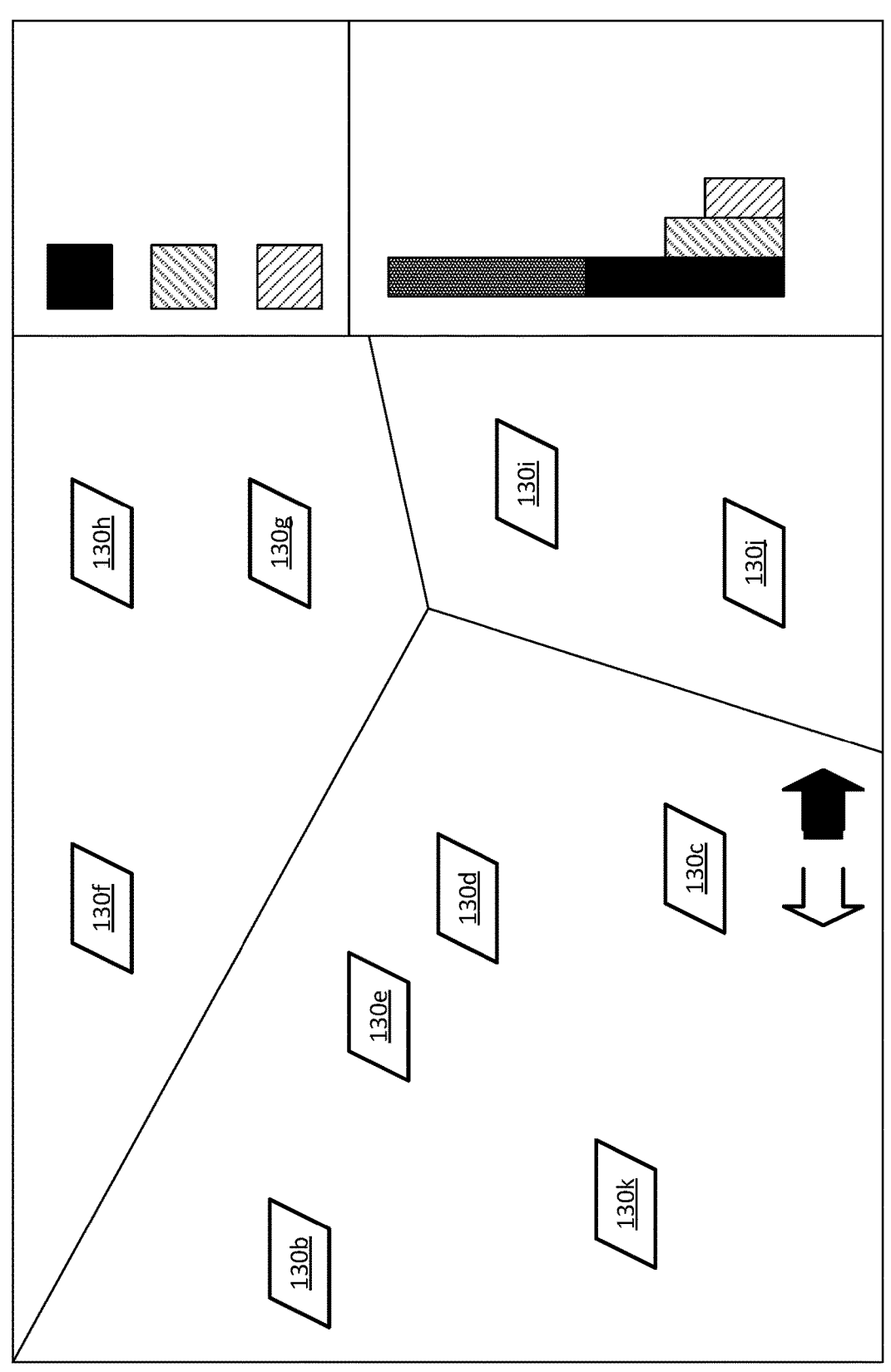
Figure 3C:
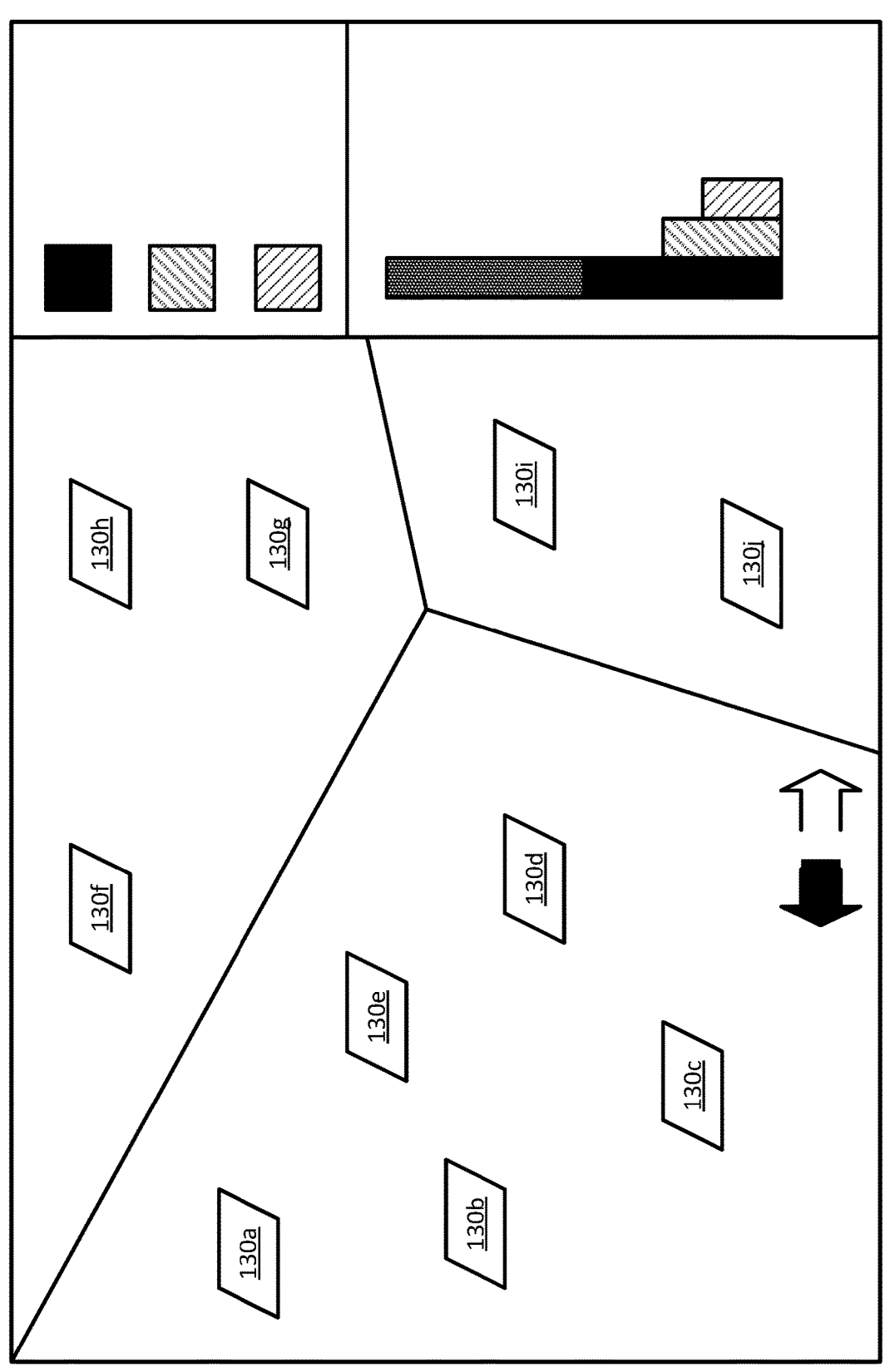

For example, in FIGS. 3A-3C, navigation controls 310a-b (generally or collectively, navigation controls 310) are provided in the first group 120a to allow a user to change which icons 130 are visible at any given time. For example, by pressing a first navigation control 310a, as in FIG. 3B, the visible icons 130 in the first group 120a update to remove the first icon 130a (as was previously visible in the first group 120a as shown in FIG. 3A) and to display the eleventh icon 130k (as was previously invisible in the first group 120a as shown in FIG. 3A). Continuing the example, by pressing a second navigation control 310b that indicates an opposing direction of navigation from the first navigation control, as in FIG. 3C compared to FIG. 3B, the visible icons 130 in the first group 120a update to remove the eleventh icon 130k (as was previously visible in the first group 120a as shown in FIG. 3B, but invisible in FIG. 3A) and to display the first icon 130k (as was previously invisible in the first group 120a as shown in FIG. 3B, but visible in FIG. 3A). In various embodiments, the user interface may omit navigation control 310, or show the navigation controls 310 as being disable, in groups with all icons 130 visible.

As shown in FIGS. 4A-4E, as the user adds data to the individual groups from the initial unassigned group 120, or from one individual group 120 to another group 120, the model may update the centrality measures for the individual groups 120 and re-determine how and which icons 130 to display in the various groups 120. Accordingly, the model actively learns how to display the icons 130 in each group 120 for the benefit of the user in assigning and grouping the data sets.

Figure 4A:
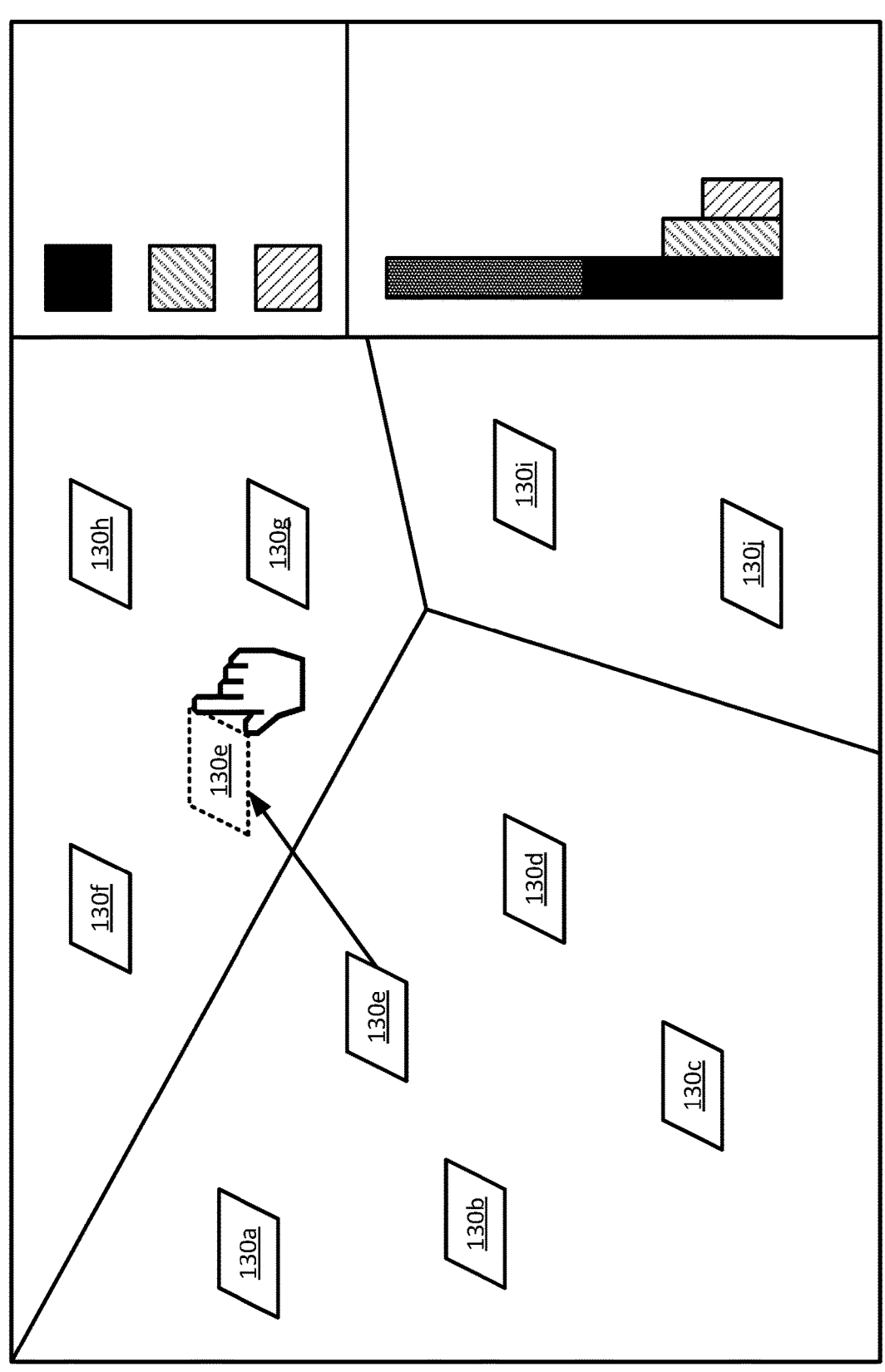
FIGS. 4A-4E illustrate an example of a user taking A&G actions in a user interface that a model can actively learn from for assigned and grouping data sets, according to embodiments of the present disclosure.
Figure 4B:
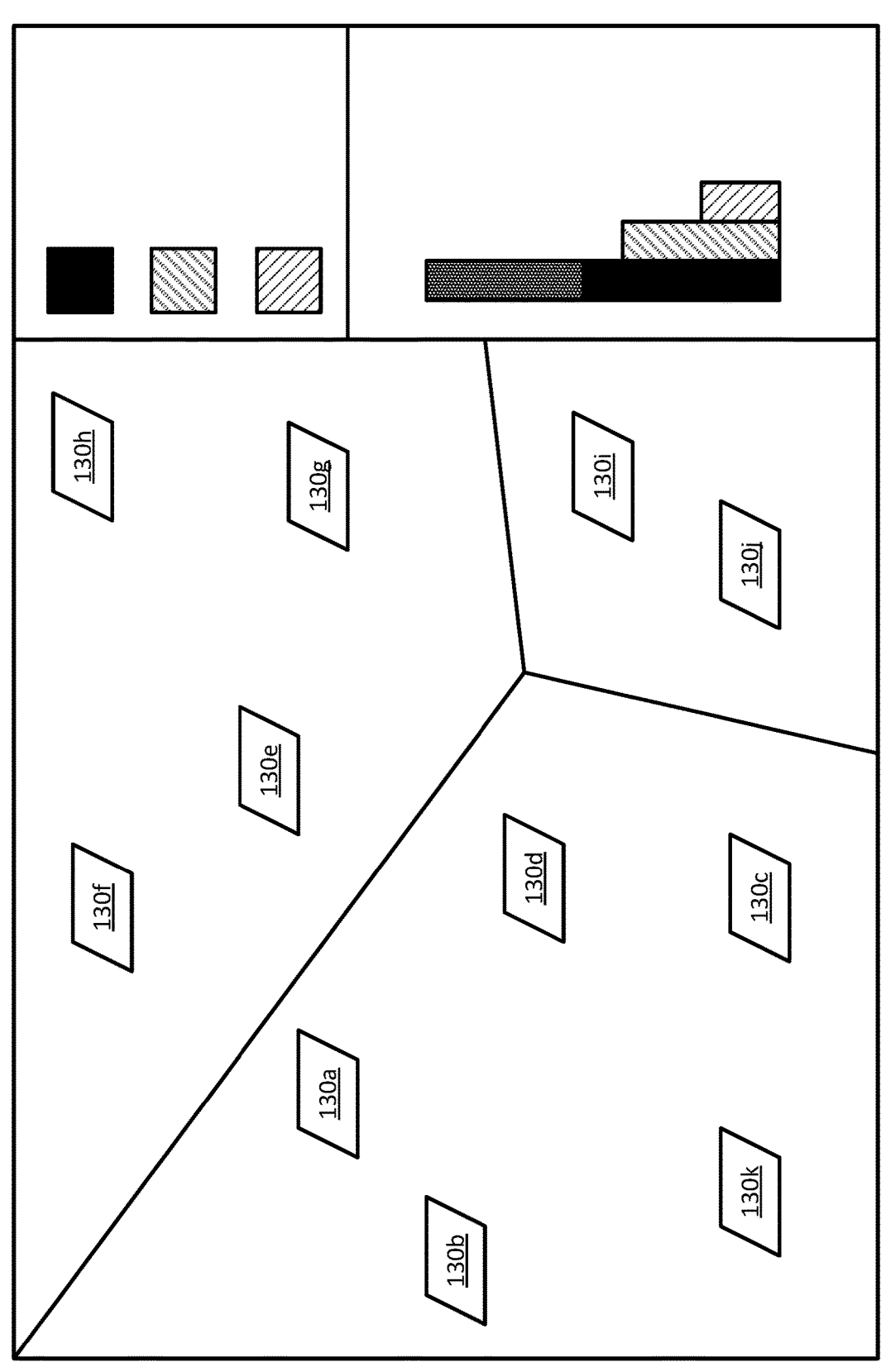

In FIG. 4A, a user manually drags the fifth icon 130e from the first group 120a to the second group 120b. In response, as shown in FIG. 4B, the data associated with the fifth icon 130e is reassigned from the first group 120a to the second group 120b and the fifth icon 130e is displayed accordingly, and model re-allocates the visibility budget to account for the change in membership of the groups 120, and permits the display of the previously invisible eleventh icon 130k in the first group 130a.

Figure 4C:
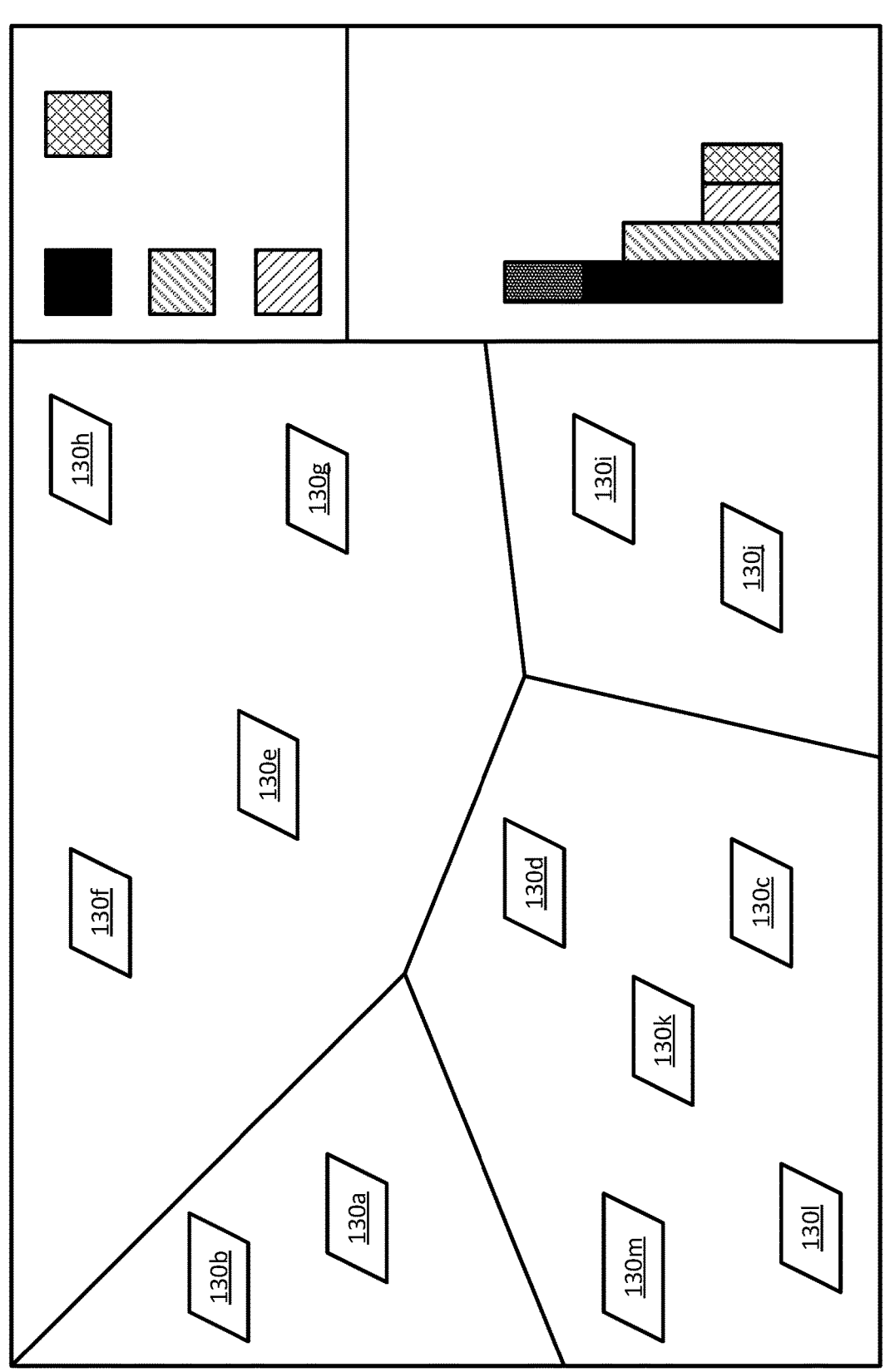

In FIG. 4C, either the user or the model has identified the first icon 130a and the second icon 130b as more appropriately belonging to a newly formed fourth group 120d rather than the first group 120a. Accordingly, the model reallocates the visibility budget among the (now) four groups 120a-d from the previously shown three groups 120a-c, and may determine to make one or more icons 130 visible that were previously invisible (e.g., the twelfth icon 130l and the thirteenth icon 130m in the first group 120a).

Figure 4D:
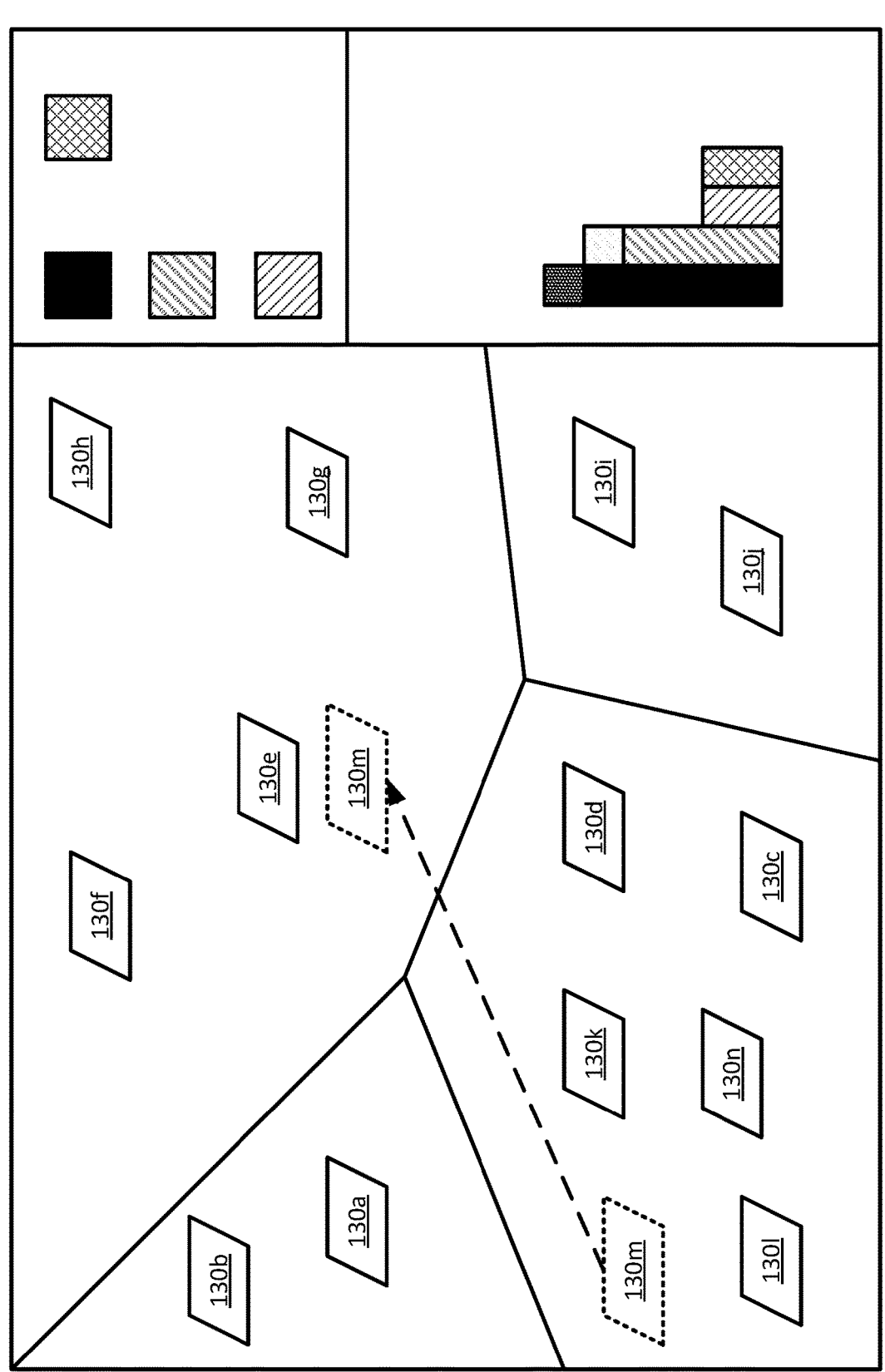

In various embodiments, moving an icon 130 (and the associated data) from one group 120 to a new group 120 may not result in that icon 130 being visible in the reassigned group 120, if other members of the target group 120 are weighted higher for visibility. For example, as shown in FIG. 4D, the thirteenth icon 130 has been moved from the first group 120a to the second group 120b, but is not visible in the second group 120b despite being visible in the first group 120a. Additionally, in response to the removal of the thirteenth icon 130m from the first group 120a, the first group 120a now visibly displays the fourteenth icon 130n using the available visibility budget allocated to the first group 120a. As shown in the visibility indicator 150 in FIG. 4D, the thirteenth icon 130 has been added to the second group 120b, despite not being visible; adding a second portion to the second bar in the visibility indicator 150 to identify that non-visible members of the second group 120b.

Figure 4E:
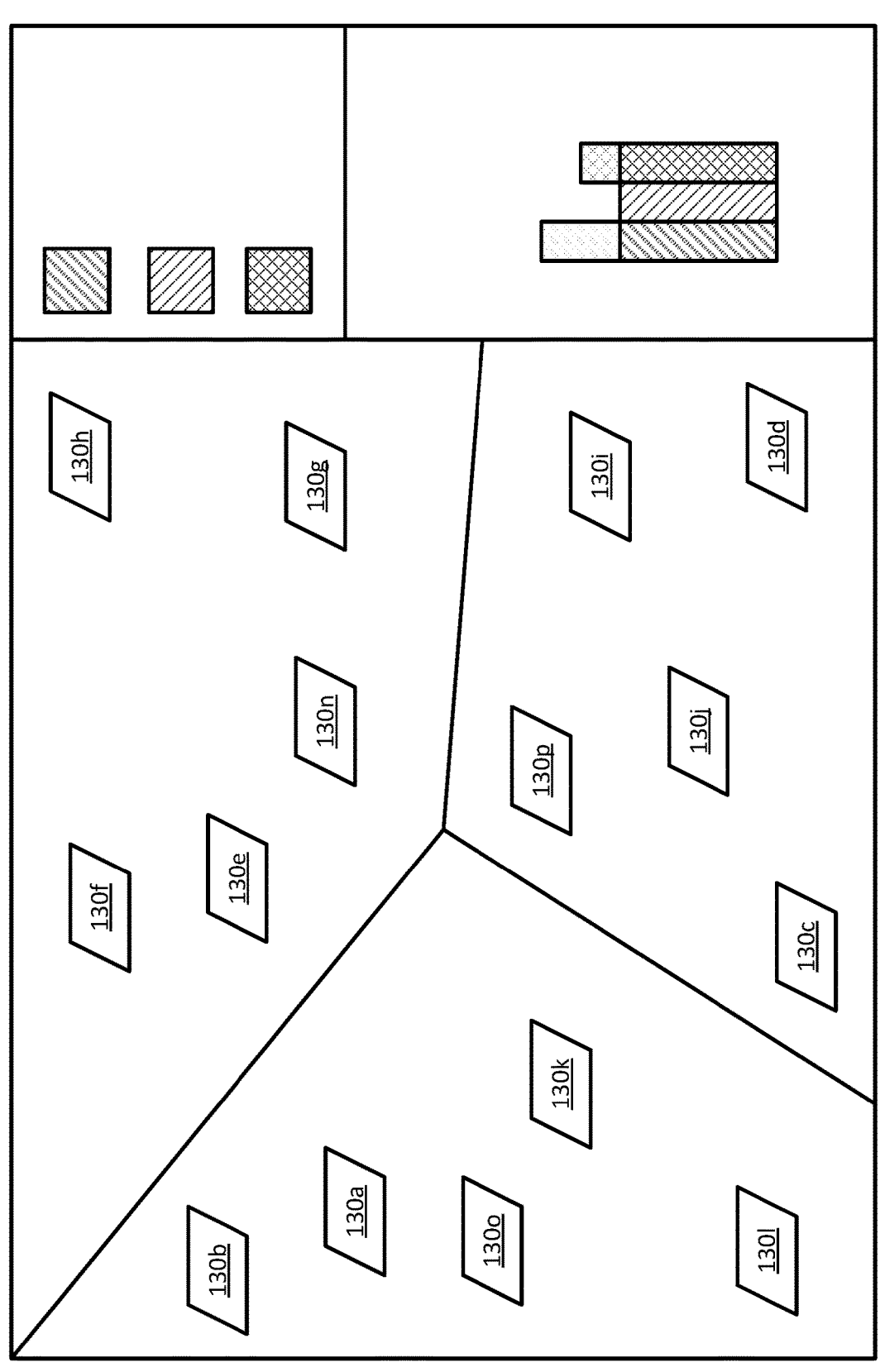

FIG. 4E illustrates a final state of the A&G task performed throughout FIGS. 4A-4E, in which three groups 120b-d are shown with an even amount of the visibility budget automatically allocated thereto, and each group 120b-d therefore being able to show five icons 130 according to the present display properties set for the user interface 100, and have the respective memberships of visible and invisible icons 130 indicated to the user via the visibility indicator 150 (e.g., two invisible icons 130 in the second group 120b, zero invisible icons in the third group 130c, and one invisible icon 130 in the fourth group 120d).

As will be noted from the groups 120 shown in FIG. 4E, the user interface 100 does not include the first group 120a. In various embodiments, at the outset of an A&G task, any data sets that have not been assigned to another class belong to an "unassigned" group 120 that may be gradually drawn from (by a human user, machine learning model, or combinations thereof) to populate the other groups 120. Once the "unassigned" group 120 has had all of the data sets initially assigned thereto assigned to another group 120, the user interface 100 may cease display of the "unassigned" group and any related indicators in the legend 140 or visibility indicator 150.

Figure 5:
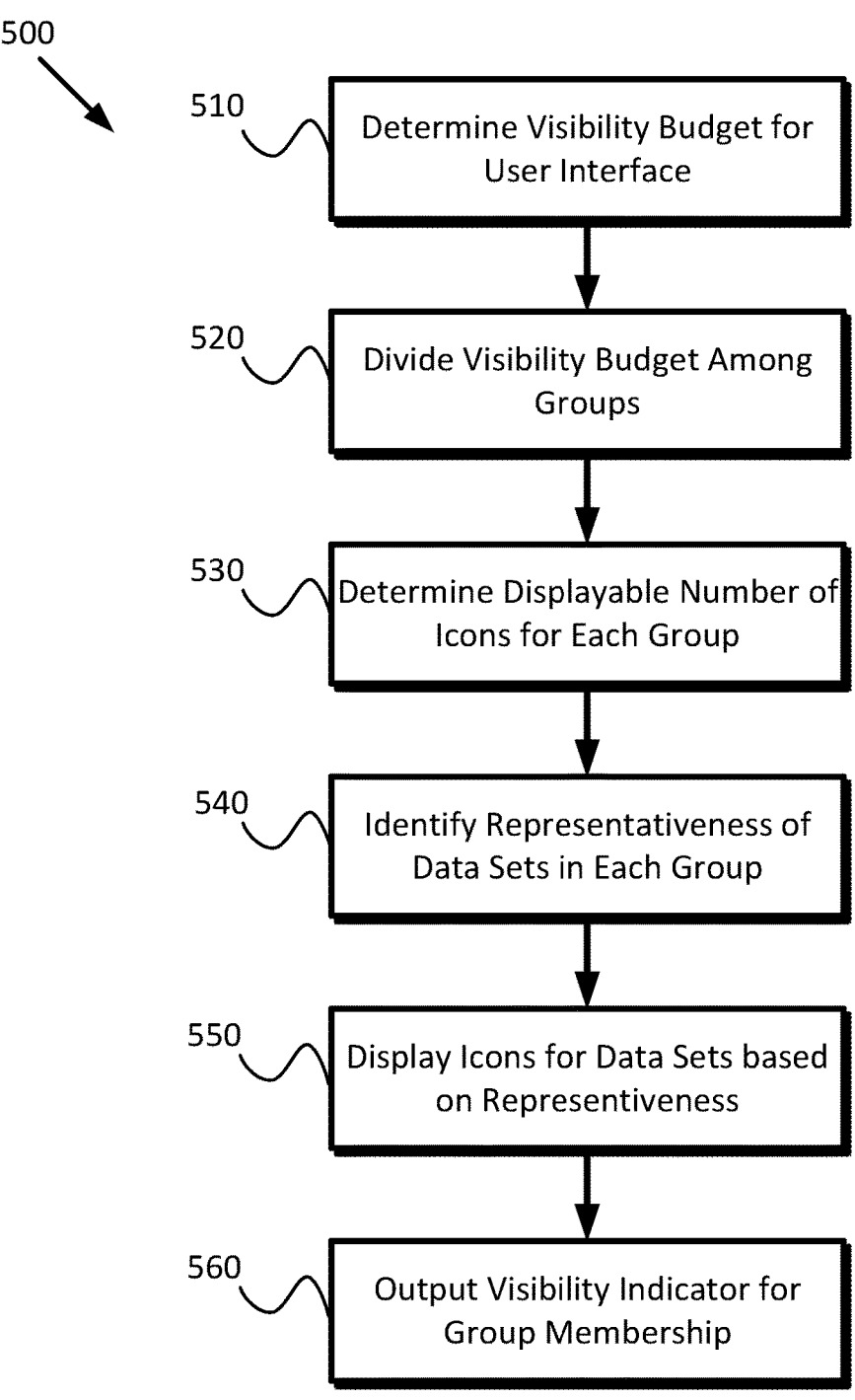
FIG. 5 is a flowchart of an example method, according to embodiments of the present disclosure.

FIG. 5 is a flowchart of an example method 500, according to embodiments of the present disclosure. Method 500 begins at block 510, where a computing device determines a visibility budget for a user interface to display an IVT. In various embodiments, the size (e.g., in inches/centimeters) and resolution (e.g., in pixels) of a display device, the portion of the display area allocated for a user interface to display the IVT, and the amount of the user interface devoted to the IVT (e.g., versus command bars, status bars, menus, etc.) are used to determine the visibility budget. Block 510 may be (re)performed in response to a command to display an IVT, moving the user interface to a new display device, adjusting setting on a display device, resizing or otherwise adjusting a layout of the user interface, or the like.

At block 520, the computing device divides the visibility budget among the groups into which the data represented by the IVT are divided. In various embodiments, the visibility budget is divided substantially evenly among all of the groups (e.g., each group of a plurality of X groups is assigned $100/X$ %±1% of the visibility budget). In some embodiments, a user may set a floor or ceiling for visibility budget assignment so that no one group is assigned less than a floor percentage of the visibility budget or more than a ceiling percentage of the visibility budget (e.g., if $100/X$ %<$V_{floor}$% the group is assigned $V_{floor}$% with the needed V % taken from one or more other groups; if $100/X$ % $V_{ceiling}$%, the group is assigned $V_{ceiling}$%, with the freed V % reassigned to one or more of the other groups). Block 520 may be (re)performed in response to a command to display an IVT, adding a group to the IVT, removing a group from the IVT, or the like.

At block 530, the computing device determines the number of icons that can be displayed for each group at a given time given the current visibility budget assigned to that group (per block 520). In various embodiments, the presence of various controls in the portion of the user interface associated with group, user-defined size ranges at which to display the icons, pagination options or zoom level in the user interface, and the like may affect the number of icons that can be displayed at one time for each group.

At block 540, the computing device identifies the representativeness of the data sets for each group. In various embodiments, a machine learning model identifies commonalities between the member data sets for a group (but may exclude performing this analysis for data sets belonging to an "unassigned" group) to identify one or more central tendencies for membership in that group. Data sets that adhere more closely to the respective central tendencies are considered to be "more-representative" than data sets that adhere less closely to these central tendencies, which are considered to be "less-representative". In various embodiments, the machine learning model may suggest to a human user (or automatically in response to a command or ongoing authorization from a human user) identify when a data set should be moved to another group (e.g., when the data set more closely adheres to a different group's central tendency) or a group may be split into two or more groups (e.g., when distinct clusters with different central tendencies are identified).

At block 550, the computing device displays icons for the data sets in each group for the identified measure of representativeness (per block 540). In various embodiments, the icons may be displayed with the most representative icons placed in a center of the display space assigned for the respective group, with progressively less-representative icons positioned outward from more-representative icons, to form a helical pattern. In some embodiments, in response to a user selecting a group as a target group (e.g., into which to reassign data sets from one or more other groups), the icons may be displayed with the most representative icons placed on the edge of the groups, where the icons for data sets that are more similar to the target group are positioned on the edges of the non-target groups, and the icons for the most-representative data sets in the target group are positioned on the edges of the target group (e.g., for ease of reassignment).

At block 560, the computing device outputs a visibility indicator for group membership. In various embodiments, the visibility indicator uses a stacked bar chart or other charting/graphing style that can indicate separate classifications for each group that includes data sets, and that can display two portions in each classification; namely, a number or ratio of data sets with visible icons versus the data sets with "hidden" or invisible icons in each group. Accordingly, the visibility indicator identifies the relative amounts of the data sets assigned to each group that are visible or hidden for each group in the respective portions of the user interface.

Figure 6:
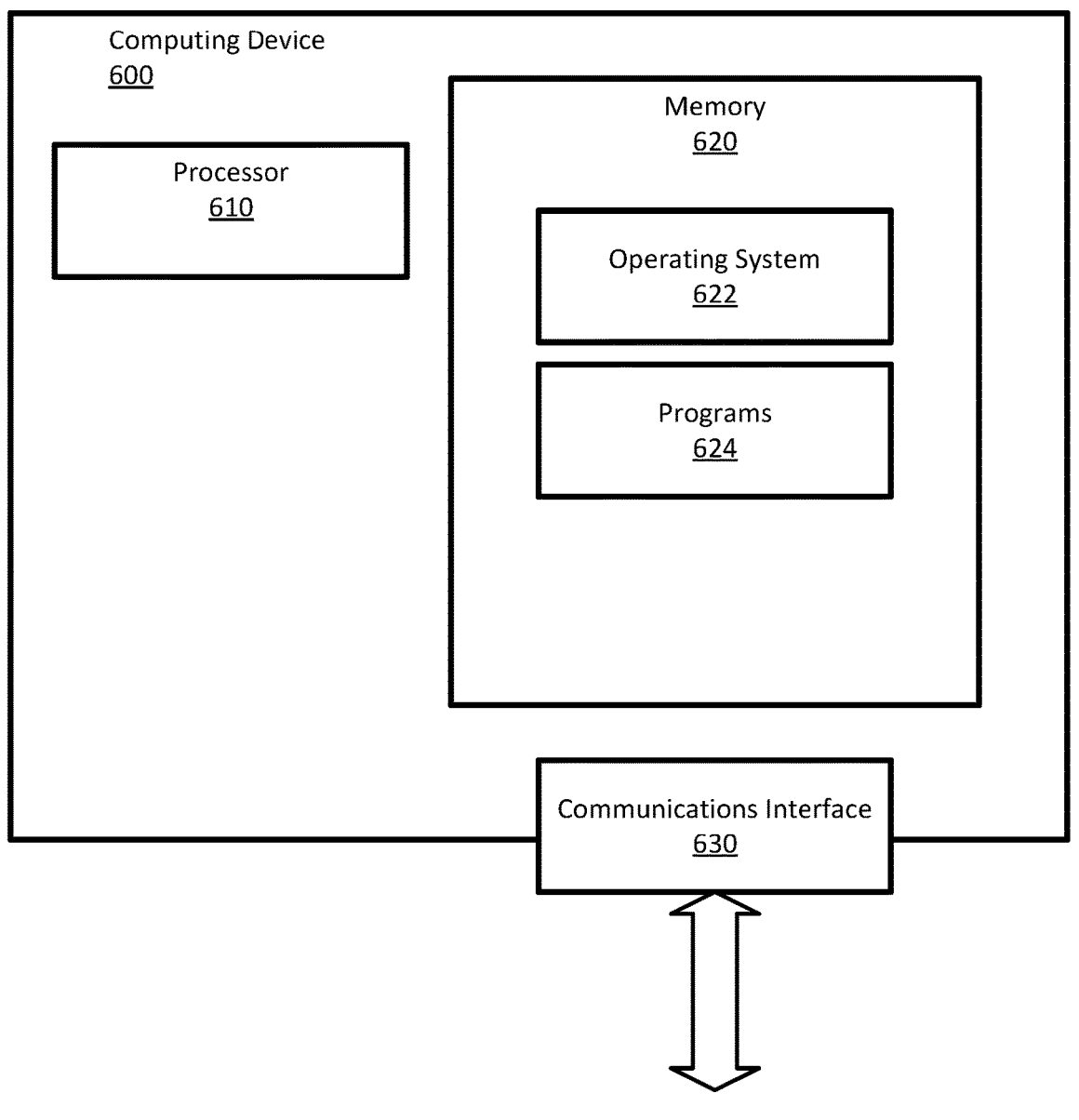
FIG. 6 illustrates a computer system, according to embodiments of the present disclosure.

FIG. 6 illustrates a computer system 600, such as may be used to perform method 500 described in relation to FIG. 5, according to embodiments of the present disclosure. The computer system 600 may include at least one processor 610, a memory 620, and a communication interface 630. In various aspects, the physical components may offer virtualized versions thereof, such as when the computer system 600 is part of a cloud infrastructure providing virtual machines (VMs) to perform some or all of the tasks or operations described for the various devices in the present disclosure.

The processor 610 may be any processing unit capable of performing the operations and procedures described in the present disclosure. In various aspects, the processor 610 can represent a single processor, multiple processors, a processor with multiple cores, and combinations thereof. Additionally, the processor 610 may include various virtual processors used in a virtualization or cloud environment to handle client tasks.

The memory 620 is an apparatus that may be either volatile or non-volatile memory and may include RAM, flash, cache, disk drives, and other computer readable memory storage devices. Although shown as a single entity, the memory 620 may be divided into different memory storage elements such as RAM and one or more hard disk drives. Additionally, the memory 620 may include various virtual memories used in a virtualization or cloud environment to handle client tasks. As used herein, the memory 620 is an example of a device that includes computer-readable storage media, and is not to be interpreted as transmission media or signals per se.

As shown, the memory 620 includes various instructions that are executable by the processor 610 to provide an operating system 622 to manage various operations of the computer system 600 and one or more programs 624 to provide various features to users of the computer system 600, which include one or more of the features and operations described in the present disclosure. One of ordinary skill in the relevant art will recognize that different approaches can be taken in selecting or designing a program 624 to perform the operations described herein, including choice of programming language, the operating system 622 used by the computer system 600, and the architecture of the processor 610 and memory 620. Accordingly, the person of ordinary skill in the relevant art will be able to select or design an appropriate program 624 based on the details provided in the present disclosure.

The communication interface 630 facilitates communications between the computer system 600 and other devices, which may also be computer system 600 as described in relation to FIG. 6. In various aspects, the communication interface 630 includes antennas for wireless communications and various wired communication ports. The computer system 600 may also include or be in communication, via the communication interface 630, one or more input devices (e.g., a keyboard, mouse, pen, touch input device, etc.) and one or more output devices (e.g., a display, speakers, a printer, etc.).

Accordingly, the computer system 600 is an example of a system that includes a processor 610 and a memory 620 that includes instructions that (when executed by the processor 610) perform various aspects of the present disclosure. Similarly, the memory 620 is an apparatus that includes instructions that when executed by a processor 610 perform various aspects of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

The invention is claimed as follows:

1. A method, comprising:

determining a visibility budget for a user interface to display a plurality of icons divided among a plurality of groups, wherein each icon provides visualization in the user interface for a corresponding data set from a plurality of data sets;

determining an assigned subset of data sets from the plurality of data sets assigned to each group of the plurality of groups;

dividing the visibility budget between the plurality of groups to provide each group of the plurality of groups with an individual visibility budget within each group, wherein the visibility budget is determined based on a size of the user interface and an entirety of a display area of a display device on which the user interface is provided, wherein each individual visibility budget is determined in proportion to the relative size of the group associated with the individual visibility budget, wherein a baseline amount of the visibility budget is assigned to each group;

for each group of the plurality of groups:

determining a displayable number of icons that can be displayed in the user interface based on the individual visibility budget associated with each group of the plurality of groups;

identifying a displayable subset of data sets from the assigned subset of data sets that are most representative of the group, wherein a number of displayable subsets is equal to a lesser of the displayable number or a total number of data sets belonging to the assigned subset for the group; and displaying, in a portion of the user interface associated with the group, associated icons for the data sets belonging to the displayable subset, wherein each group displayed includes at least one visible icon; and outputting a visibility indicator identifying relative amounts of the data sets assigned to each group that are visible or hidden for each group of the plurality of groups in respective portions of the user interface, wherein the dividing of the visibility budget between the plurality of groups is configured to reduce an amount of unused space on the display area of the display device.

2. The method of claim 1, wherein the visibility indicator is a stacked bar chart having a bar associated with each group to which data sets are assigned, each bar having a first portion associated with the icons that are visible in the user interface and a second portion associated with the data sets for a corresponding group not associated with the icons that are visible.

3. The method of claim 1, wherein the visibility budget is divided substantially evenly among all of the plurality of groups.

4. The method of claim 1, wherein identifying the displayable subset of data sets from the assigned subset of data sets that are most representative of the group includes:

assessing members of the assigned subset of data sets based on a centrality measure for membership in the group, wherein the members that score higher on the centrality measure are deemed more representative than the members that score lower on the centrality measure.

5. The method of claim 1, wherein identifying the displayable subset of data sets from the assigned subset of data sets that are most representative of the group includes, in response to receiving selection of a first group, for each group of the plurality of groups other than the first group:

assessing members of the assigned subset of data sets based on a centrality measure for membership in the group, wherein the members that score higher on the centrality measure are deemed more representative than the members that score lower on the centrality measure.

6. A system, comprising:

a processor; and a memory, including instructions that when executed by the processor perform operations comprising:

determining a visibility budget for a user interface to display a plurality of icons divided among a plurality of groups, wherein each icon provides visualization in the user interface for a corresponding data set from a plurality of data sets;

determining an assigned subset of data sets from the plurality of data sets assigned to each group of the plurality of groups;

dividing the visibility budget between the plurality of groups to provide each group of the plurality of groups with an individual visibility budget within each group, wherein the visibility budget is determined based on a size of the user interface and an entirety of a display area of a display device on which the user interface is provided, wherein each individual visibility budget is determined in proportion to the relative size of the group associated with the individual visibility budget, wherein a baseline amount of the visibility budget is assigned to each group;

for each group of the plurality of groups:

determining a displayable number of icons that can be displayed in the user interface based on the individual visibility budget associated with each group of the plurality of groups;

identifying a displayable subset of data sets from the assigned subset of data sets that are most representative of the group, wherein a number of displayable subsets is equal to a lesser of the displayable number or a total number of data sets belonging to the assigned subset for the group; and displaying, in a portion of the user interface associated with the group, associated icons for the data sets belonging to the displayable subset, wherein each group displayed includes at least one visible icon; and outputting a visibility indicator identifying relative amounts of the data sets assigned to each group that are visible or hidden for each group of the plurality of groups in respective portions of the user interface, wherein the dividing of the visibility budget between the plurality of groups is configured to reduce an amount of unused space on the display area of the display device.

7. The system of claim 6, wherein the visibility indicator is a stacked bar chart having a bar associated with each group to which data sets are assigned, each bar having a first portion associated with the icons that are visible in the user interface and a second portion associated with the data sets for a corresponding group not associated with the icons that are visible.

8. The system of claim 6, wherein the visibility budget is divided substantially evenly among all of the plurality of groups.

9. The system of claim 6, wherein identifying the displayable subset of data sets from the assigned subset of data sets that are most representative of the group includes:

assessing members of the assigned subset of data sets based on a centrality measure for membership in the group, wherein the members that score higher on the centrality measure are deemed more representative than the members that score lower on the centrality measure.

10. The system of claim 6, wherein identifying the displayable subset of data sets from the assigned subset of data sets that are most representative of the group includes, in response to receiving selection of a first group, for each group of the plurality of groups other than the first group:

assessing members of the assigned subset of data sets based on a centrality measure for membership in the group, wherein the members that score higher on the centrality measure are deemed more representative than the members that score lower on the centrality measure.

11. A non-transitory computer readable storage medium including instructions that when executed by a processor perform operations comprising:

determining a visibility budget for a user interface to display a plurality of icons divided among a plurality of groups, wherein each icon provides visualization in the user interface for a corresponding data set from a plurality of data sets;

determining an assigned subset of data sets from the plurality of data sets assigned to each group of the plurality of groups;

dividing the visibility budget between the plurality of groups to provide each group of the plurality of groups with an individual visibility budget within each group, wherein the visibility budget is determined based on a size of the user interface and an entirety of a display area of a display device on which the user interface is provided, wherein each individual visibility budget is determined in proportion to the relative size of the group associated with the individual visibility budget, wherein a baseline amount of the visibility budget is assigned to each group;

for each group of the plurality of groups:

determining a displayable number of icons that can be displayed in the user interface based on the individual visibility budget associated with each group of the plurality of groups;

identifying a displayable subset of data sets from the assigned subset of data sets that are most representative of the group, wherein a number of displayable subsets is equal to a lesser of the displayable number or a total number of data sets belonging to the assigned subset for the group; and displaying, in a portion of the user interface associated with the group, associated icons for the data sets belonging to the displayable subset, wherein each group displayed includes at least one visible icon; and outputting a visibility indicator identifying relative amounts of the data sets assigned to each group that are visible or hidden for each group of the plurality of groups in respective portions of the user interface, wherein the dividing of the visibility budget between the plurality of groups is configured to reduce an amount of unused space on the display area of the display device.

12. The computer readable storage medium of claim 11, wherein the visibility indicator is a stacked bar chart having a bar associated with each group to which data sets are assigned, each bar having a first portion associated with the icons that are visible in the user interface and a second portion associated with the data sets for a corresponding group not associated with the icons that are visible.

13. The computer readable storage medium of claim 11, wherein identifying the displayable subset of data sets from the assigned subset of data sets that are most representative of the group includes:

assessing members of the assigned subset of data sets based on a centrality measure for membership in the group, wherein the members that score higher on the centrality measure are deemed more representative than the members that score lower on the centrality measure.

14. The computer readable storage medium of claim 11, wherein identifying the displayable subset of data sets from the assigned subset of data sets that are most representative of the group includes, in response to receiving selection of a first group, for each group of the plurality of groups other than the first group:

assessing members of the assigned subset of data sets based on a centrality measure for membership in the group, wherein the members that score higher on the centrality measure are deemed more representative than the members that score lower on the centrality measure.

15. The method of claim 1, wherein displaying, in the portion of the user interface associated with the group, the associated icons for the data sets belonging to the displayable subset further comprises, arranging the associated icons in a helical pattern in the portion of the user interface, wherein the associated icons are arranged in the helical pattern sequentially according to a centrality measure, wherein the associated icons associated with higher centrality measures are displayed more centrally in the helical pattern and the portion of the user interface than the associated icons associated with lower centrality measures.

16. The system of claim 6, wherein displaying, in the portion of the user interface associated with the group, the associated icons for the data sets belonging to the displayable subset further comprises, arranging the associated icons in a helical pattern in the portion of the user interface, wherein the associated icons are arranged in the helical pattern sequentially according to a centrality measure, wherein the associated icons associated with higher centrality measures are displayed more centrally in the helical pattern and the portion of the user interface than the associated icons associated with lower centrality measures.

17. The computer readable storage medium of claim 11, wherein displaying, in the portion of the user interface associated with the group, the associated icons for the data sets belonging to the displayable subset further comprises, arranging the associated icons in a helical pattern in the portion of the user interface, wherein the associated icons are arranged in the helical pattern sequentially according to a centrality measure, wherein the associated icons associated with higher centrality measures are displayed more centrally in the helical pattern and the portion of the user interface than the associated icons associated with lower centrality measures.

* * * * *